3,278,565
19-AMINOANDROSTENES AND -10α-
ANDROSTENES
Albert Bowers, Mexico City, Mexico, assignor to Syntex Corporation, Panama, Panama, a corporation of Panama
No Drawing. Filed Dec. 18, 1963, Ser. No. 331,361
28 Claims. (Cl. 260—397.4)

This is a continuation-in-part of copending application Serial No. 246,017, filed December 20, 1962, now abandoned, and 282,869, filed May 24, 1963, now abandoned.

The present invention relates to novel cyclopentanophenanthrene derivatives and to a process for the production thereof.

More particularly it refers to novel 19-amino-Δ⁴-androsten-17β-ol-3-one compounds and to the 10α-derivatives thereof.

The novel compounds of the present invention are represented by the following formulae:

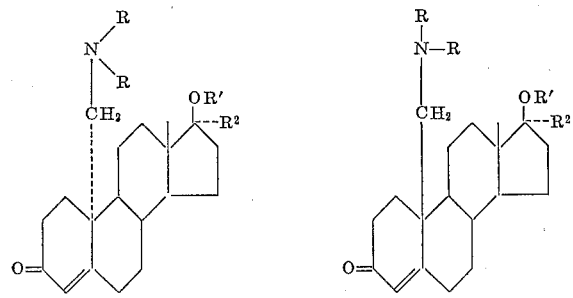

In the above formulae R represents hydrogen or lower alkyl; $R^1$ represents hydrogen or a hydrocarbon carboxylic acyl group of less than 12 carbon atoms; and $R^2$ represents hydrogen, lower alkyl, lower alkenyl or lower alkinyl.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The novel compounds of the present invention represented by the above formulae are anabolic-androgenic agents with a favorable anabolic-androgenic ratio. In addition, they have anti-estrogenic, anti-gonadotrophic, anti-fibrillatory and appetite stimulating properties. Furthermore, they lower the blood cholesterol level, relieve premenstrual tension and suppress the output of the pituitary gland. They may also be used as anti-pyretic and non-narcotic analgesic agents.

The novel compounds of the present invention may be prepared by the process exemplified as follows:

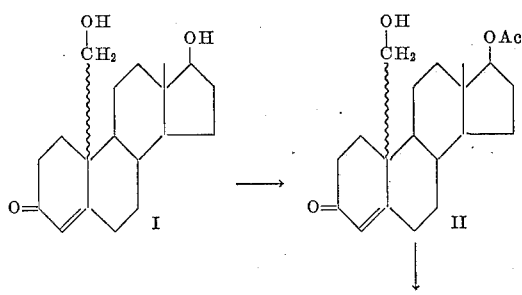

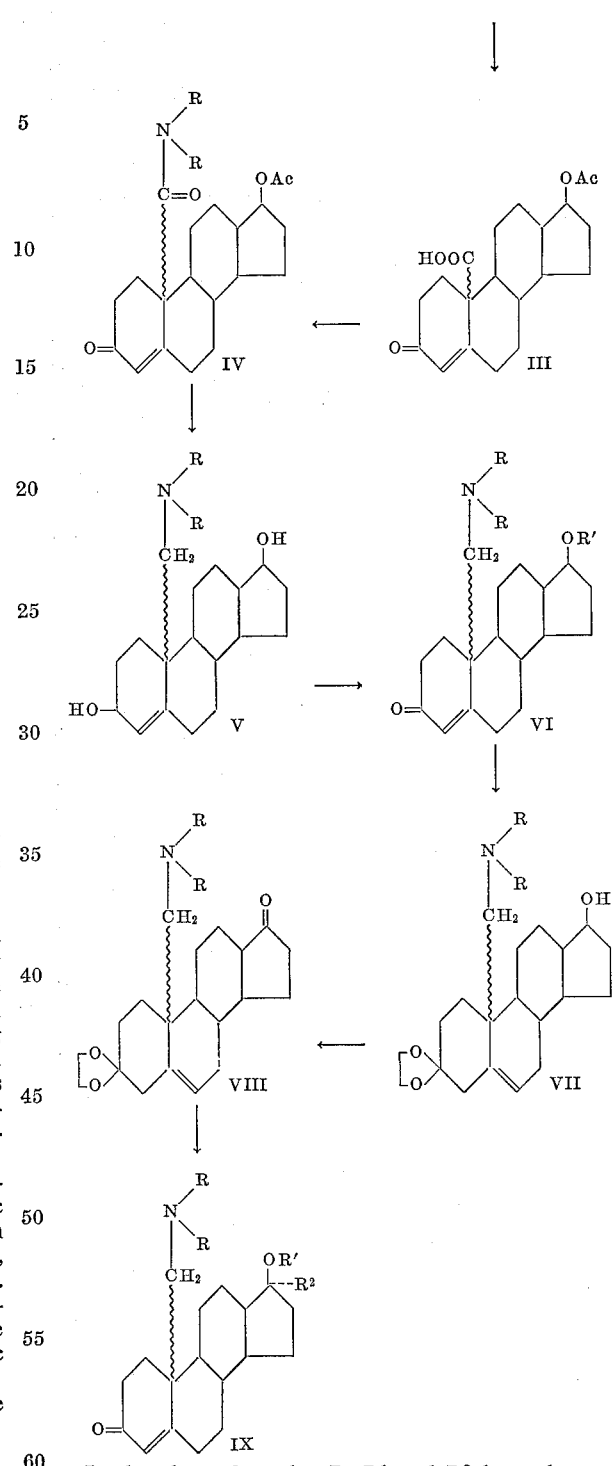

In the above formulae R, $R^1$ and $R^2$ have the same meaning as set forth hereinbefore; ⌇ indicates that C–19 may have the α or β configurations.

In practicing the process outlined above the starting 19-hydroxy-testosterone or 19-hydroxy-10α-testosterone (I) is selectively acylated in the 17 position by treatment with triphenyl methyl chloride in pyridine preferably at steam bath temperature to give the corresponding 19-trityl ether, followed by conventional acylation in pyridine, preferably with acetic anhydride, and by acid treatment, in order to hydrolyze the 19-trityl group, preferably with hydrogen bromide in acetic acid, thus affording the corresponding 19-hydroxy-testosterone-17-acetate (II). The latter 19-hydroxy compound (II) is oxidized preferably with 8 N chromic acid, to the corresponding 17$\beta$-acetoxy-$\Delta^4$-androsten-3-one-19-oic acid (III). The latter acid upon treatment with oxalyl chloride, preferably at reflux temperature for a period of time of the order of 2 hours; yields the corresponding 17$\beta$-acetoxy-$\Delta^4$-androsten-17$\beta$-ol-3-one-19-oic acyl chloride, which upon treatment with ammonia or a di-(lower alkyl) amine, such as dimethylamine, yields the corresponding amide (IV). The latter amide is reduced preferably with lithium aluminum hydride in a suitable solvent such as tetrahydrofuran, thus affording the corresponding 19-amino-$\Delta^4$-androstene-3$\beta$,17$\beta$-diol (V), which upon selective oxidation of the 3$\beta$-hydroxyl group, by treatment with approximately 1 molar equivalent of 2,3-dichloro-5,6-dicyano-1,4-benzoquinone, preferably at room temperature for a period of time of the order of 3 hours, yields the corresponding 19-amino-$\Delta^4$-androsten-17$\beta$-ol-3-one (VI: $R^1$=H). The latter $\Delta^4$-3-ketones (VI) are treated with ethylene glycol in the presence of p-toluenesulfonic acid, preferably in benzene solution to produce the corresponding 3-cycloethylenedioxy-19-amino-$\Delta^5$-androsten-17$\beta$-ol derivatives (VII), which upon oxidation in a mildly basic medium, preferably under conventional Oppenauer conditions, afford the corresponding 3-cycloethylenedioxy-19-amino-$\Delta^5$-androsten-17-one compounds (VIII). The latter 17-ketones are treated with a lower (alkyl, alkenyl or alkinyl) magnesium halide, such as methyl, vinyl or ethinyl magnesium bromide, in a suitable solvent, e.g. ether, benzene, etc., thus yielding the corresponding 17$\alpha$-lower (alkyl, alkenyl or alkinyl)-17$\beta$-alcohols which upon treatment in an acid medium under conventional conditions afford the corresponding 17$\alpha$-substituted 19-amino-$\Delta^4$-androsten-17$\beta$-ol-3-one compounds (IX).

The compounds of the present invention having a secondary hydroxyl group, for example in C-17, are conventionally acylated in the presence of hydrogen chloride with approximately 1 molar equivalent of a hydrocarbon carboxylic acid of the type defined hereinbefore, thus affording the corresponding acylates.

The compounds of the present invention having in the molecule a tertiary hydroxyl group and a tertiary amino group are conventionally esterified in the presence of p-toluenesulfonic acid with an acylating agent, such as acetic anhydride, caproic anhydride, cyclopentylpropionic anhydride or enanthic anhydride to produce the correspond esters.

The following specific examples serve to illustrate but are not intended to limit the scope of the present invention:

*Example I*

A mixture of 1 g. of 19-hydroxy-10$\alpha$-testosterone (Sondheimer et al. Tetrahedron Letters, No. 22, 38, (1960)). 3 g. of triphenylmethyl chloride and 15 cc. of pyridine was heated on a steam bath for 2 hours, then it was cooled to 5° C. and 2 cc. of acetic anhydride were added. The resulting mixture was kept at the same temperature for 24 hours, then it was poured slowly into ice-water and the resulting precipitate collected by filtration and dried. The dry solid was mixed thoroughly with 20 cc. of acetic acid and there were added 3 cc. of a saturated solution of hydrogen bromide in acetic acid. The resulting mixture was stirred for 3 minutes, then poured into ice-water and the formed precipitate collected by filtration, washed with water, dried and crystallized from acetone-hexane, thus yielding 19-hydroxy-10$\alpha$-testosterone-17-acetate (Cpd. No. 1).

*Example II*

A solution of 1 g. of Compound No. 1 in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture for 10 minutes. It was stirred for 5 minutes further at 0–5° C. and diluted with water. The precipitate was collected, washed with water and dried under vacuum, thus affording a crude product which upon recrystallization from acetone-hexane gave the 17$\beta$-acetoxy-$\Delta^4$-10$\alpha$-androsten-3-one-19-oic acid (Cpd. No. 2).

*Example III*

A mixture of 1 g. of Compound No. 2 and 5 cc. of oxalyl chloride was refluxed under anhydrous conditions during 2 hours. The solution was evaporated in vacuum, 2 portions of dry benzene were added and reevaporated to eliminate traces of oxalyl chloride, thus affording the 17$\beta$-acetoxy-$\Delta^4$-10$\alpha$-androsten-17$\beta$-ol-3-one-19-oic acyl chloride (Cpd. No. 3).

*Example IV*

1 g. of Compound No. 3 in 50 cc. of dry ether, was added portionwise to 25 cc. of liquid ammonia, and the solvent and excess ammonia was permitted to evaporate overnight. Crystallization of the residue from methanol-water furnished the amide of the 17$\beta$-acetoxy-$\Delta^4$-10$\alpha$-androsten-3-one-19-oic acid (Cpd. No. 4).

*Example V*

1 g. of Compound No. 3 was treated with 2 cc. of dimethylamine in 50 cc. of benzene. The reaction mixture was left overnight at room temperature, then an aqueous solution of sodium carbonate was added. The resulting mixture was extracted with ether, the extract dried over sodium sulfate and evaporated to dryness. Crystallization from methanol water afforded the N,N-dimethyl amide of the 17$\beta$-acetoxy-$\Delta^4$-10$\alpha$-androsten-3-one-19-oic acid (Cpd. No. 5).

*Example VI*

A solution of 1 g. of Compound No. 4, in 50 cc. of tetrahydrofuran was added over a 30 minutes period to a stirred suspension of 1 g. of lithium aluminum hydride in 50 cc. of anhydrous tetrahydrofuran. The mixture was refluxed for 2 hours, then cooled and cautiously treated with 5 cc. of ethyl acetate and 2 cc. of water. Solid sodium sulfate was added, the inorganic material filtered off and thoroughly washed with hot ethyl acetate, the combined organic solutions upon evaporation yielded a crude material, which was purified by crystallization from acetone-hexane thus giving 19-amino-$\Delta^4$-10$\alpha$-androstene-3$\beta$,17$\beta$-diol (Cpd. No. 6).

When applying the same procedure to Compound No. 5, there was produced 19-(N,N-dimethylamino)-$\Delta^4$-10$\alpha$-androstene-3$\beta$,17$\beta$-diol (Cpd. No. 7).

*Example VII*

A mixture of 1 g. of Compound No. 6 in 20 cc. of dioxane, and 1.1 molar equivalents of 2,3-dichloro-5,6-dicyano-1,4-benzoquinone was kept at room temperature for 3 hours. The hydroquinone formed during the reaction was filtered off, and the filtrate evaporated to dryness. The residue was dissolved in acetone and filtered through 20 g. of alumina. Crystallization from acetone hexane gave 19-amino-$\Delta^4$-10$\alpha$-androsten-17$\beta$-ol-3-one (Cpd. No. 8).

Upon treatment of Compound No. 7 by the same procedure, there was produced 19-(N,N-dimethylamino)-$\Delta^4$-10$\alpha$-androsten-17$\beta$-ol-3-one (Cpd. No. 9).

*Example VIII*

A mixture of 5 g. of Compound No. 8, 150 cc. of anhydrous benzene, 60 cc. of ethyleneglycol distilled over sodium hydroxide and 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 3-cycloethylenedioxy - 19 - amino - $\Delta^5$ - 10$\alpha$ - androsten-17$\beta$-ol (Cpd. No. 10).

The Compound No. 9 was treated by the same procedure thus yielding 3 - cycloethylenedioxy - 19 - (N,N - dimethylamino)-$\Delta^5$-10$\alpha$-androsten-17$\beta$-ol (Cpd. No. 11).

*Example IX*

A solution of 1 g. of Compound No. 10 in 80 cc. of toluene and 20 cc. of cyclohexanone was dried by distilling of 10 cc. of the solvent. A solution of 1 g. of aluminum isopropoxide dissolved in 7 cc. of anhydrous toluene was then added and the mixture was refluxed for 45 minutes; acetic acid was added till neutral and the solvents removed by steam distillation. The product was treated with 25 cc. of 10% sodium carbonate solution, extracted several times with ethyl acetate and the organic extracts washed abundantly with water, dried over anhydrous sodium sulfate and evaporated to dryness. Crystallization from acetone-hexane afforded 3-cycloethylenedioxy-19-amino-$\Delta^5$-10$\alpha$-androsten-17-one (Cpd. No. 12).

The Compound No. 11 was treated by the same procedure thus giving 3-cycloethylenedioxy-19-(N,N-dimethylamino)-$\Delta^5$-10$\alpha$-androsten-17-one (Cpd. No. 13).

*Example X*

A solution of 5 g. of Compound No. 12 in 250 cc. of thiophene-free benzene was treated with 27.5 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 3-cycloethylenedioxy-17$\alpha$-methyl-19-amino-$\Delta^5$-10$\alpha$-androsten-17$\beta$-ol (Cpd. No. 14).

Upon treatment of Compound No. 13 by the latter procedure there was produced 3-cycloethylenedioxy-17$\alpha$-methyl-19-(N,N-dimethylamino)-$\Delta^5$-10$\alpha$-androsten-17$\beta$-ol (Cpd. No. 15).

*Example XI*

The Compounds Nos. 12 to 13, were treated according to Example X, except that vinyl magnesium bromide was used instead of methyl magnesium bromide, thus giving respectively:

3 - cycloethylenedioxy - 17$\alpha$ - vinyl - 19 - amino - $\Delta^5$-10$\alpha$-androsten-17$\beta$-ol (Cpd. No. 16) and 3-cycloethylenedioxy - 17$\alpha$ - vinyl - 19 - (N,N - dimethylamino) - $\Delta^5$-10$\alpha$-androsten-17$\beta$-ol (Cpd. No. 17).

*Example XII*

The Compounds Nos. 12 and 13 were treated according to Example X, except that methyl magnesium bromide was substituted by ethinyl-magnesium-bromide, thus yielding respectively:

3 - cycloethylenedioxy - 17$\alpha$ - ethinyl - 19 - amino - $\Delta^5$-10$\alpha$-androsten-17$\beta$-ol (Cpd. No. 18) and 3-cycloethylenedioxy - 17$\alpha$ - ethinyl - 19 - (N,N - dimethylamino) - $\Delta^5$-10$\alpha$-androsten-17$\beta$-ol (Cpd. No. 19).

*Example XIII*

500 mg. of Compound No. 14 were dissolved in 30 cc. of acetone and treated with 50 mg. of p-toluenesulfonic acid, the reaction mixture was kept at room temperature overnight. It was then poured into cold 2% aqueous sodium hydroxide, extracted with ethyl acetate and the organic extract washed with water to neutral, dried and evaporated to dryness. Addition of ether gave 17$\alpha$-methyl - 19 - amino - $\Delta^4$-10$\alpha$-androsten-17$\beta$-ol-3-one (Cpd. No. 20).

Following the same procedure there were treated the Compounds Nos. 15 to 19, inclusive, thus yielding respectively:

Cpd. No.:
21. 17$\alpha$-methyl-19-(N,N-dimethylamino)-$\Delta^4$-10$\alpha$-androsten-17$\beta$-ol-3-one.
22. 17$\alpha$-vinyl-19-amino-$\Delta^4$-10$\alpha$-androsten-17$\beta$-ol-3-one.
23. 17$\alpha$-vinyl-19-(N,N-dimethylamino)-$\Delta^4$-10$\alpha$-androsten-17$\beta$-ol-3-one.
24. 17$\alpha$-ethinyl-19-amino-$\Delta^4$-10$\alpha$-androsten-17$\beta$-ol-3-one.
25. 17$\alpha$-ethinyl-19-(N,N-dimethylamino)-$\Delta^4$-10$\alpha$-androsten-17$\beta$-ol-3-one.

*Example XIV*

Through a solution of 1 g. of Compound No. 8 in 20 cc. of dioxane and 1.1 molar equivalents of acetic acid, was passed a slow current of hydrogen chloride for 3 hours. The reaction mixture was then poured into 100 cc. of water, and washed with methylene chloride. The aqueous layer was alkalized with a 5% aqueous sodium hydroxide solution and extracted with ethyl acetate. The organic layer was washed with water, dried, and evaporated to dryness. The residue crystallized from acetone-benzene, thus furnishing 19-amino-$\Delta^4$-10$\alpha$-androsten-17$\beta$-ol-3-one 17-acetate (Cpd. No. 26).

Upon treatment of Compound No. 9 by the same procedure, there was produced 19-(N,N-dimethylamino)-$\Delta^4$-10$\alpha$-androsten-17$\beta$-ol-3-one 17-acetate (Cpd. No. 27).

*Example XV*

To a solution of 5 g. of Compound No. 21 in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 17$\alpha$-methyl-19-(N,N-dimethylamino)-$\Delta^4$-10$\alpha$-androsten-17$\beta$-ol-3-one 17-caproate (Cpd. No. 28).

The Compounds Nos. 23 and 25, were treated by the same procedure, yielding respectively:

Cpd. No.:
29. 17$\alpha$-vinyl-19-(N,N-dimethylamino)-$\Delta^4$-10$\alpha$-androsten-17$\beta$-ol-3-one caproate,
30. 17$\alpha$-ethinyl-19-(N,N-dimethylamino)-$\Delta^4$-10$\alpha$-androsten-17$\beta$-ol-3-one caproate.

*Example XVI*

The starting compounds of Example XV were treated following exactly the procedure described in that example, except that caproic anhydride was substituted by acetic anhydride, propionic anhydride, enanthic anhydride and cyclopentylpropionic anhydride thus affording respectively the corresponding acetates, propionates, enanthates, and cyclopentylpropionates, of said starting compounds.

*Example XVII*

19-hydroxy-testosterone was treated successively according to Examples I, II, III and IV, thus yielding respectively:

Cpd. No.:
31. 19-hydroxy-testosterone-17-acetate,
32. 17$\beta$-acetoxy-$\Delta^4$-androsten-3-one-19-oic acid,
33. 17$\beta$-acetoxy-$\Delta^4$-androsten-3-one-19-oic acyl chloride,
34. The amide of 17$\beta$-acetoxy-$\Delta^4$-androsten-3-one-19-oic acid.

Example XVIII

Compound No. 33 was treated according to Example V to give the N,N-dimethylamide of the 17β-acetoxy-Δ⁴-androsten-3-one-19-oic acid (Cpd. No. 35).

Example XIX

Compounds Nos. 34 and 35 were treated according to Example VI, thus giving respectively:

19 - amino - Δ⁴ - androstene - 3β,17β - diol (Cpd. No. 36) and 19-(N,N-dimethylamino)-Δ⁴-androstene-3β,17β-diol (Cpd. No. 37).

Example XX

The Compounds Nos. 36 and 37 were treated by the procedure described in Example VII thus yielding respectively:

Cpd. No.:
38. 19-amino-Δ⁴-androsten-17β-ol-3-one and
39. 19-(N,N-dimethylamino)-Δ⁴-androsten-17β-ol-3-one.

Example XXI

When treating Compounds Nos. 38 and 39 by the procedure of Example VIII there were respectively produced:

Cpd. No.:
40. 3-cycloethylenedioxy-19-amino-Δ⁵-androsten-17β-ol,
41. 3-cycloethylenedioxy-19-(N,N-dimethylamino)-Δ⁵-androsten-17β-ol.

Example XXII

The Compound Nos. 40 and 41 were treated according to Example IX to give respectively:

Cpd. No.:
42. 3-cycloethylenedioxy-19-amino-Δ⁵-androsten-17-one,
43. 3-cycloethylenedioxy-19-(N,N-dimethylamino)-Δ⁵-androsten-17-one.

Example XXIII

The Compounds Nos. 42 and 43 were treated in accordance with Example X to give respectively:

Cpd. No.:
44. 3-cycloethylenedioxy-17α-methyl-19-amino-Δ⁵-androsten-17β-ol,
45. 3-cycloethylenedioxy-17α-methyl-19-(N,N-dimethylamino)-Δ⁵-androsten-17β-ol.

Example XXIV

The Compounds Nos. 42 and 43 were treated according to Example XI to produce respectively:

Cpd. No.:
46. 3-cycloethylenedioxy-17α-vinyl-19-amino-Δ⁵-androsten-17β-ol,
47. 3-cycloethylenedioxy-17α-vinyl-19-(N,N-dimethylamino)-Δ⁵-androsten-17β-ol.

Example XXV

The Compounds Nos. 42 and 43 were treated following the procedure described in Example XII, yielding respectively:

Cpd. No.:
48. 3-cycloethylenedioxy-17α-ethinyl-19-amino-Δ⁵-androsten-17β-ol,
49. 3-cycloethylenedioxy-17α-ethinyl-19-(N,N-dimethylamino-Δ⁵-androsten-17β-ol.

Example XXVI

The Compounds Nos. 44 to 49 inclusive, were treated in accordance with Example XIII thus giving respectively:

Cpd. No.:
50. 17α-methyl-19-amino-Δ⁴-androsten-17β-ol-3-one,
51. 17α - methyl - 19-(N,N-dimethylamino)-Δ⁴-androsten-17β-ol-3-one,
52. 17α-vinyl-19-amino-Δ⁴-androsten-17β-ol-3-one,
53. 17α - vinyl - 19-(N,N-dimethylamino)-Δ⁴-androsten-17β-ol-3-one,
54. 17α-ethinyl-19-amino-Δ⁴-androsten-17β-ol-3-one,
55. 17α - ethinyl - 19-(N,N-dimethylamino)-Δ⁴-androsten-17β-ol-3-one.

Example XXVII

The Compounds Nos. 38 and 39 were treated following the procedure of Example XIV to give respectively:

Cpd. No.:
56. 19-amino-Δ⁴-androsten-17β-ol-3-one 17-acetate,
57. 19 - (N,N - dimethylamino)-Δ⁴-androsten-17β-ol-3-one 17-acetate.

Example XXVIII

The Compounds Nos. 51, 53 and 55, were treated according to Example XV to give respectively:

Cpd. No.:
58. 17a - methyl - 19-(N,N-dimethylamino)-Δ⁴-androsten-17β-ol-3-one 17caproate,
59. 17a - vinyl - 19-(N,N-dimethylamino)-Δ⁴-androsten-17β-ol-3-one-17-caproate,
60. 17α-ethinyl-19-(N,N-dimethylamino-Δ⁴-androsten-17β-ol-3-one-17-caproate.

Example XXIX

The starting compounds of Example XXVIII were treated following exactly the procedure described in that example, except that caproic anhydride was substituted by acetic anhydride, propionic anhydride, enanthic anhydride and cyclopentylpropionic anhydride thus affording respectively the corresponding acetates, propionates enanthates, and cyclopentylpropionates of said starting compounds.

I claim:
1. A compound of the following formula:

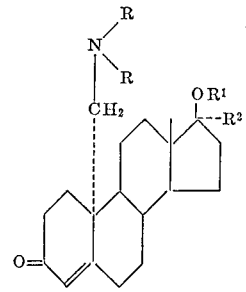

wherein R is selected from the group consisting of hydrogen and lower alkyl; R¹ is a member of the group consisting of hydrogen and a hydrocarbon carboxylic acyl group of less than 12 carbon atoms; and R² is a member of the group consisting of hydrogen, lower alkyl, lower alkenyl and lower alkinyl.

2. 19-amino-Δ⁴-10α-androsten-17β-ol-3-one.
3. 19 - (N,N - dimethylamino)-Δ⁴-10α-androsten-17β-ol-3-one.
4. 17α - methyl - 19-amino-Δ⁴-10α-androsten-17β-ol-3-one.
5. 17α - methyl - 19-(N,N-dimethylamino)-Δ⁴-10α-androsten-17β-ol-3-one.
6. 17α-vinyl-19-amino-Δ⁴-10α-androsten-17β-ol-3-one.
7. 17α - vinyl - 19-(N,N-dimethylamino)-Δ⁴-10α-androsten-17β-ol-3-one.
8. 17α - ethinyl - 19-amino-Δ⁴-10α-androsten-17β-ol-3-one.
9. 17α - ethinyl - 19-(N,N-dimethylamino)-Δ⁴-10α-androsten-17β-ol-3-one.

10. 19 - amino - Δ⁴-10α-androsten-17β-ol-3-one-17-acetate.

11. 19 - (N,N - dimethylamino-Δ⁴-10α-androsten-17β-ol-3-one 17-acetate.

12. 17α - methyl - 19 - (N,N-dimethylamino)-Δ⁴-10α-androsten-17β-ol-3-one 17-caproate.

13. 17α - vinyl - 19-(N,N-dimethylamino)-Δ⁴-10α-androsten-17β-ol-3-one caproate.

14. 17α - ethinyl - 19-(N,N-dimethylamino)-Δ⁴-10α-androsten-17β-ol-3-one caproate.

15. A compound of the following formula:

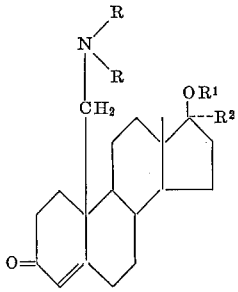

wherein R is selected from the group consisting of hydrogen and lower alkyl; R¹ is a member of the group consisting of hydrogen and a hydrocarbon carboxylic acyl group of less than 12 carbon atoms; and R² is a member of the group consisting of hydrogen, lower alkyl, lower alkenyl and lower alkinyl.

16. 19-amino-Δ⁴-androsten-17β-ol-3-one.

17. 19-(N,N-dimethylamino)-Δ⁴-androsten-17β-ol-3-one.

18. 17α-methyl-19-amino-Δ⁴-androsten-17β-ol-3-one.

19. 17α-methyl-19-(N,N-dimethylamino)-Δ⁴-androsten-17β-ol-3-one.

20. 17α-vinyl-19-amino-Δ⁴-androsten-17β-ol-3-one.

21. 17α-vinyl-19-(N,N-dimethylamino)-Δ⁴-androsten-17β-ol-3-one.

22. 17α-ethinyl-19-amino-Δ⁴-androsten-17β-ol-3-one.

23. 17α-ethinyl-19-(N,N-dimethylamino)-Δ⁴-androsten-17β-ol-3-one.

24. 19-amino-Δ⁴-androsten-17β-ol-3-one-17-acetate.

25. 19-(N,N-dimethylamino)-Δ⁴-androsten-17β-ol-3-one 17-acetate.

26. 17α-methyl-19-(N,N-dimethylamino)-Δ⁴-androsten-17β-ol-3-one 17-caproate.

27. 17α-vinyl-19-(N,N-dimethylamino)-Δ⁴-androsten-17β-ol-3-one caproate.

28. 17α-ethinyl-19-(N,N-dimethylamino)-Δ⁴-androsten-17β-ol-3-one caproate.

No references cited.

LEWIS GOTTS, *Primary Examiner*.

T. M. MESHBESHER, *Assistant Examiner*.